United States Patent [19]
Dir

[11] Patent Number: 4,506,956
[45] Date of Patent: Mar. 26, 1985

[54] MULTICOLOR LIQUID CRYSTAL DISPLAY WITH A DEAD FRONT

[75] Inventor: Gary A. Dir, Fairport, N.Y.

[73] Assignee: Xerox Corporation, Stamford, Conn.

[21] Appl. No.: 480,162

[22] Filed: Mar. 29, 1983

[51] Int. Cl.³ .............................................. G02F 1/133
[52] U.S. Cl. ................................. 350/339 F; 350/349
[58] Field of Search ............ 350/349, 337, 345, 350 R, 350/314, 339 F; 362/293, 311; 355/79, 80

[56] References Cited

U.S. PATENT DOCUMENTS

| | | | |
|---|---|---|---|
| 2,213,382 | 9/1940 | Busse | 95/73 |
| 2,356,694 | 8/1944 | Potter et al. | 350/314 |
| 3,551,026 | 12/1970 | Heilmeier | 350/349 |
| 3,597,044 | 8/1971 | Castellano | 350/349 |
| 3,963,312 | 6/1976 | Wild | 350/337 |
| 4,124,279 | 11/1978 | Byles | 350/345 |
| 4,206,501 | 6/1980 | Brooks | 350/345 |
| 4,211,473 | 7/1980 | Shanks | 350/337 |
| 4,288,147 | 9/1981 | Koch | 350/349 |
| 4,342,046 | 7/1982 | Kamata | 358/75 |

OTHER PUBLICATIONS

"New Multicolor Liquid Crystal Displays That Use a Twisted Nematic Electro-Optic Cell", by T. J. Scheffer, from Journal of Applied Physics, Nov. 1973, vol. 44, No. 11, pp. 4799–4803.

Electro-Optical Color Effects by Twisted Nematic Liquid Crystals, by I. A. Shanks, from Electronic Letters, Apr. 4, 1974, vol. 10, No. 7, pp. 90–91.

Optical Characteristics of Twisted Nematic-Liquid--Crystal Films, by C. H. Gooch and H. A. Tarry, from Electronic Letters, Jan. 10, 1974, vol. 10, No. 10, pp. 2–4.

Guest-Host Interactions in Nematic Liquid Crystals, A New Electro-Optic Effect, by G. H. Herlmeier and L. A. Zanoni, from Applied Physics Letters, Aug. 1, 1968, vol. 13, No. 3, pp. 91–92.

New Absorptive Modes Reflective Liquid-Crystal Display Device, by D. L. White and G. N. Taylor, from Journal of Applied Physics, Nov. 1974, vol. 45, No. 11, pp. 4718–4723.

The Four Variables of the Visual Threshold, by P. W. Cobb and F. K. Moss, from Franklin Inst. Journal, Jun. 1928, vol. 205, No. 1230-57, pp. 831–847.

An Experimental Determination of Visual Thresholds at Low Values of Illumination, by J. P. Connor and R. E. Ganoung, from Journal of the Optical Society of America, Sep. 1935, vol. 25, pp. 287–294.

U.S. patent application Ser. No. 420,963 to John W. Daughton, filed Sep. 21, 1982.

*Primary Examiner*—John K. Corbin
*Assistant Examiner*—David Lewis
*Attorney, Agent, or Firm*—Robert A. Chittum

[57] ABSTRACT

A multicolor display which comprises a high contrast liquid crystal device, light source and a luminance balanced color mask. The liquid crystal device is the transmissive, twisted nematic type having high extinction ratio polarizers on the input and output sides and functions as a light shutter for the display. The liquid crystal material has a dichroic dye admixed therein to prevent buildup of the contrast limiting orthogonal mode electric vector of polarized light. The color mask contains different colored patches with gray surround about them, and each colored patch is luminance balanced in order that each different colored data presented are of substantially equal brightness. during the off-state there is no light bleed through so that the display presents a uniformly dark state or dead front.

19 Claims, 13 Drawing Figures

MULTICOLOR LIQUID CRYSTAL DISPLAY WITH A DEAD FRONT

FIELD OF THE INVENTION

The present invention relates to multicolor liquid crystal displays and, more particularly, to a multicolor liquid crystal display utilizing a transmissive, high-contrast, twisted-nematic liquid crystal cell which functions as a light shutter, a rich-in-red light source and a luminance balanced color mask.

DESCRIPTION OF THE PRIOR ART

Multicolor displays using a twisted nematic (TN) liquid crystal cell and polarizers have been typically realized through two prior art schemes. In one scheme, the liquid crystal layer serves only to twist linearly polarized light as in the usual TN liquid crystal cell. Using polarized white light, a transmitted color is then obtained as a result of the selective absorption produced by two external, crossed colored pleochroic polarizing filters. In a second scheme, colors are transmitted by selective interference obtained with white light, using an externally positioned optical retardation plate. Refer to Scheffer, T. J., (1973), "New Multi-Color Liquid Crystal Displays That Used a TN Electro-optic Cell," J. Applied Physics, 44(11), pp. 4799-4803. The first scheme is preferable because its construction is simpler.

FIG. 2 shows the operating principle of such a two-color liquid crystal cell 210 mentioned above as the first scheme. This cell consists of a neutral (panchromatic) polarizer 212, a 90° twist TN liquid crystal cell 214 and two dichroic analyzers 216 and 218. In this arrangement, it is assumed that the polarizing axes of the neutral polarizer 212 and the dichroic analyzer 218 are positioned vertically and that the polarizing axis of the dichroic analyzer 216 is positioned horizontally. It is also assumed that the polarizer 212 absorbs all the incident light, except that light with electric vector in the vertical direction. Finally, it is assumed that the analyzers 216 and 218 allow light with electric vector in the direction of their polarizing axis to pass through irrespective of color and absorb incident light of all other polarization directions, except for the light of one color component, which is allowed to pass through regardless of the direction in which it vibrates. In the case of FIG. 2, it is assumed that the analyzer 216 allows the green color of all polarization directions to pass through and that the analyzer 218 allows the red color component to pass through. The liquid crystal molecules in the TN cell 214 are aligned on the inside surface of the cell parallel to the polarizing axes of the corresponding adjacent polarizers when the cell is in the off-state.

In operation, incident white light from source 200 is polarized vertically by the polarizer 212 and then passes through the liquid crystal layer, the polarization direction essentially following the alignment of the molecules. The white light thus leaves the cell horizontally polarized, so that all of its color components can pass through the analyzer 216. When the light strikes the analyzer 218, only the red component can pass through because the polarizing axis of the analyzer 218 is perpendicular to that of the analyzer 216 and an observer perceives red light. On the other hand, when a voltage in excess of the threshold voltage is applied across the electrode of the liquid crystal cell 214, the molecules are oriented perpendicular to both electrodes. As a result, incident polarized light passes through the cell with its polarization direction unchanged. In this case, only the green component of the light will pass through the analyzer 216. This light will also pass through the analyzer 218 without being absorbed and the observer will perceive a green color. Analyzers of the type described can be purchased commercially in the form of two dichroic polarizers of arbitrary color with their polarizing axes oriented at 90° with respect to each other. Refer to Shanks, I. A., (1974), "Electro-Optical Color Effects by TN Liquid Crystal, Electron. Letters" 10(7), pp. 90-91.

Many of the performance characteristics of TN two-color display cells, such as response time, operating voltage, and power consumption, are the same as those for conventional TN display cells, since both types of display have the same basic construction except that the two cells have additional polarizers. Therefore, a two-color matrix display can be made with this scheme in which the applied voltage controls the color (instead of brightness) of each pixel of the matrix. Although good color separation can be obtained, no more than two colors can be displayed with this scheme. A serious shortcoming of such displays is their low brightness, especially when a reflecting type of display is used, since a large amount of light is absorbed by the polarizer and the analyzers.

It is also well known to use a typical transmissive, twisted-nematic, liquid crystal display device as a light shutter and insert a colored filter between a light source and the input side of the TN liquid crystal display. However, these prior art devices permit bleed-through during the off-state condition, so that the underlying color filters or patches can be seen by the human eye even though unactivated. Existing prior multicolor displays are adequate for some uses; however, they are unduly unattractive for uses in the office equipment environment or in auto instrument panels. The present invention overcomes this bleed-though problem by incorporating a high contrast, TN liquid crystal display device, a selected light source and luminance balanced color mask as more fully described below.

Since the high contrast, TN liquid crystal display is an important part of the present invention, and is an improvement over the prior art in its own right, a discussion of the conventional TN, liquid crystal display devices is presented below to enable the understanding of the improvement of the high contrast liquid crystal display over the art.

A typical prior art transmissive-type, twisted nematic liquid crystal device 10 is shown in FIG. 1A in the off state and in FIG. 1B in the energized state. A polarizer 11 and an analyzer 12 are attached to the outside surfaces of the glass plates 13, 13a. The polarizing axes of these are made parallel, coinciding with the direction of alignment of the liquid crystal molecules 14 at the top plate 13a. Because of the relatively gradual twist of the liquid crystal molecules, polarized light entering the liquid crystal material gradually twists its direction of polarization as it passes therethrough, emerging with its polarization rotated by 90 degrees. Since this light is blocked by the output analyzer 12, the device appears nearly opaque when viewed from the output side. Generally, the prior art disclosures state that the twisted nematic devices possess wave-guide-like properties. That is, a first polarizer plane polarizes white light which, due to a wave-guide-like action, is rotated by the twist angle of the liquid crystal molecules. While this is approximately true, the statement is not exact. As will be explained later, approximately 2% of the light exists in an orthogonal polarized component which easily passes through the analyzer resulting in "bleed-through." The multicolor liquid crystal display of the present invention prevents this orthogonal light component from exiting the liquid crystal material, as will be fully described later. The elimination of the passage of the orthogonal component of light increases the white light optical contrast above levels previously thought possible and substantially reduces the bleed-through problem encountered with a conventional TN liquid crystal display.

Generally, liquid crystal materials used in twisted-nematic devices have a positive dielectric anisotropy, so that, when a voltage is applied, the director of the molecules in the center of the layer tends to orient itself parallel to the applied field, as shown in FIG. 1B. Above some threshold voltage (e.g., 1 to 3 volts) the molecules become oriented with the director everywhere parallel to the applied field, except for those bound at the immediate surfaces of the glass. Since, in this condition, the liquid crystal layer no longer twists the direction of polarization of the light, it passes through the analyzer unobstructed. The fact that at intermediate voltages partial light transmission occurs is of importance in devices where gray scale is required. If the applied voltage is cut off, intermolecular forces causes the liquid crystal molecules to return to the twisted configuration of FIG. 1A, blocking most of the light transmission. Essentially, no dc current is required to produce a change in optical state because of the high resistivity ($>10^{10}$ ohm cm) of the liquid crystal materials. The power for switching such a device on, therefore, is low, usually less than 1 $\mu W/cm^2$.

It is important to realize that conventional displays are not limited in contrast by fundamental properties of the liquid crystal itself. Rather, contrast is polarizer limited. Manufacturers of these displays, mostly of the reflective type, choose polarizing materials which are optically efficient to achieve the brightest display possible when used in ambient illumination. Film polarizers have the property that those that give the highest extinction ratio also tend to be the most lossy. By extinction ratio it is meant the intensity of the light passed by two parallel polarizers divided by the value for the crossed case. Therefore, high contrast and high brightness are not simultaneously obtained. In fact, a trade-off must be made between contrast and brightness.

Tables 1(a) and 1(b) below illustrates this point. In Table 1(a) a list of polarizers as well as measured extinction ratios are shown. The Polaroid Corporation conveniently identifies their products with a number which is a measure of the white light transmission of a single polarizer to randomly polarized white light. For example, an HN55 transmits 55% of unpolarized whight light, etc.

In Table 1(b), the on axis white light photopic contrast ratio of a 10 micron thick LCD cell filled with Merck liquid crystal #1132, a biphenyl mixture, is shown with polarizers which have a wide range of extinction ratios.

TABLE 1(a)

| Polarizer | Extinction Ratio |
| --- | --- |
| Polaroid HN-55 | 3.59 |
| Polaroid HN-48 | 3.80 |
| Polaroid HN-42 | 143 |

TABLE 1(a)-continued

| Polarizer | Extinction Ratio |
| --- | --- |
| Polaroid HN-32 | ~8,000 |

TABLE 1(b)

| Polarizer | Extinction Ratio | Contrast Ratio |
| --- | --- | --- |
| Polaroid HN-48 | 3.80 | 3.69 |
| Sanritz LC-82-13 | 15.6 | 11.0 |
| Polaroid HN-32 | ~8,000 | 46.7 |

Conventional twisted nematics (TN) materials only change the state of light polarization. Polarizers are required to transform the light polarization changes to light intensity differences which are detectable by the human eye.

Using HN48's a contrast in transmission of 3.69 was obtained which is within 3% of the maximum of 3.8. If Sanritz Limited LC-82-13's are used, a contrast ratio of 11.0 is obtained, 30% lower than the maximum of 15.6. If very high extinction ratio polarizers such as Polaroid HN32's are used, the contrast increases substantially, a value of 46.7 is obtained. However, the contrast ratio is now orders of magnitude below the extinction ratio of 8,000 which is possible with polarizers alone. Clearly, the first two cases give results which are polarizer limited while the final one is not. This result indicates that a typical TN cell passes about 2% of white light which is not due to any deficiency in the polarizers themselves, as mentioned above.

Thus, to operate in the regime where contrast and density are not polarizer limited, high extinction ratio polarizers must be used. Further, increases in contrast and density require changes in the liquid crystal cell itself. Such changes, as described below, form part of the present invention.

One would conclude if complete wave-guide action existed that plane polarized white light would exit the last layer of liquid crystal molecules. In fact, the light leaving the liquid crystal material is weakly elliptically polarized.

A more complete description of this phenomena follows. In addition to the main plane polarized mode which follows the twist of the cell, a second mode of propagation with its electric vector at right angles (orthogonal) to the first mode builds up. This mode is free to be passed by the final polarizer (analyzer). Since about 2% of the light is in this mode, contrast is limited to 50:1. Gooch and have Tarry have described in the following reference, a mathematical treatment of the light propagation which includes the orthogonal mode.

C. H. Gooch and H. A. Tarry, "Optical Characteristics of Twisted Nematic Liquid Crystal Films," Electronic Letters, 10, 1, 1974.

By using Gooch and Tarry's formulation, it can readily be shown that liquid crystal layer thicknesses in access of 10 $\mu$m greatly reduce the light transmission.

Twisted nematic LCDs are typically operated in the so-called Mauguin limit; that is, the wavelength of light ($\lambda$) is much less than twice the birefringence ($\Delta\eta$) times the liquid crystal layer thickness d:

$$\lambda << 2\Delta\eta d$$

A typical value for $2\Delta\eta d$ ($\Delta\eta=0.14$, $d=10$ microns) is about 3. Such a liquid crystal cell would operate in what may be referred to as the near mauguin limit. If the liquid crystal layer thickness and/or birefringence is increased, the optical contrast is increased. If we were to increase the layer thickness so that $2\Delta\eta d$ is much greater than 3, which may be deemed the far mauguin limit, to say a value of 10, the photopic contrast ratio becomes several hundred to one. However, there is a price to pay for this improvement in contrast; viz, the viewing angle and turn-off time are compromised. Since the turn-off time is proportional to the thickness squared, a long turn-off time would be encountered. This increased turn-off time is unacceptable for uses in multicolor liquid crystal displays utilized in, for example, office automation equipment and automotive instrument panels.

A technique for reducing the orthogonal light component without using thick cells which result in increase turn-off times involves the addition of a dichroic dye to the liquid crystal material. The inclusion of a dichroic dye to prevent the build-up of the orthogonal component pertains to the subject of part of the present invention. The incorporation of dichroic dyes in liquid crystals was first described in the following reference:

G. H. Heilmeier and L. A. Zanoni, Appl. Phys. Lett. 13, 91, 1968.

Heilmeier coined the term "Guest-Host Effect" which is now widely used. The liquid crystal, present in high concentration is the "host" while the dichroic dye, present in small concentration is the "Guest." The liquid crystal essentially governs the electrical properties while the dye is there for its advantageous optical properties.

Simply stated, when the dichroic dye has its long, absorbing axes coparallel to the electric vector of incident light, maximum absorption takes place. When the absorbing axes and light electric vector are at right angles, minimum absorption takes place. FIG. 3 illustrates two typical states for a "Heilmeier-typeA" device. Note no molecular twist exists in this configuration. Further note that a single polarizer on one side of the device only is used. The first public disclosure of a dichroic dye in a twisted configuration was made in the following reference:

D. L. White and G. N. Taylor, J. Appl. Phys. 45, 4718, 1974.

In this device, there are a number of turns of the molecular helix allowing incident randomly polarized white light to be absorbed to a degree. This allows the device to be operated with no polarizers.

In liquid crystal materials, thermally induced temporal fluctuations in the molecular axis exist. Thus, the plane of polarization of incident light is not always parallel to the liquid crystal and/or dichroic dye molecular axis. Consequently, contrast ratio is reduced at a given temperature. There exists liquid crystal materials which fluctuate by different amounts. Those with minimal fluctuation have high order parameters and are the most desirable.

The addition of dichroic dyes to liquid crystal material is well known. However, dyes are generally used for features such as broad viewing angles or elimination of one or both polarizers. Since less than about 10 weight percent of dye can be dissolved in state-of-the-art liquid crystal materials (order parameter≈0.75), the prior art teaches that the contrast ratio of the images that is obtained is limited to about 10:1. The high contrast LCD which forms a part of the present invention overcomes this limitation.

U.S. Pat. No. 4,288,147 to Koch discloses a host liquid crystal admixed with various guest dichroic dyes. In this patent, the electro-optic composition has a host liquid crystal which may include conventional and well-known materials such as nematic and cholestric liquid crystals, while the guest dichroic dye is characterized as a linear, non-condensed aromatic compound which includes a quinonoid ring as the chromophore or color generating group. In positive dichroic dyes, such as discussed in this patent, light which impinges on the dye molecule (generally having a long, rod-like structure) perpendicular to its long axes is absorbed more strongly than light which impinges on the molecule parallel to its long axes. This patent discloses that the advantageous properties of dyes of this type are attributable to their long structure which results in a high order parameter and thus improved contrast and to the quinonoid ring as the color generating group. These dyes impart color when incident light impinges on the dye molecules perpendicular to their long axes. The liquid crystal solution is colorless when the incident light impinges parallel to the dye long axes.

U.S. Pat. No. 4,211,473 to Shanks discloses a reflective-type liquid crystal display device having front and rear polarizers and a reflector. An enhanced contrast is achieved for this type of device by the use of pleochroic dye in the liquid crystal display material, a rear polarizer, pleochroic and fluorescent materials are incorporated in balanced proportion and have absorption and emission spectra, respectively, that are complementary. Light incident on the display is converted so that the light reaching the eye from the bright state regions is neutral grey in contrast to the light from the dark state regions which is strongly attenuated and may be strongly colored.

U.S. Pat. No. 2,213,382 to Busse discloses an apparatus for enhancing the quality of color reproduction. The apparatus contains a filter in the projection system which consists of vertical strips of various colors with uncolored strips therebetween. The uncolored strips may consist of a gray filter with a characteristic absorption of light equal to the absorption of light by the colored strips.

U.S. Pat. No. 4,342,046 to Kamata discloses a contact screen for making color separation halftone blocks for use in a picture reproducing machine consisting of a plurality of colored halftone screens having different screen angles which are arranged on a base film in positions corresponding to color separation reproduction pictures to be reproduced and with transparent blank spaces formed between the adjacent halftone screens through which register lines can be recorded.

SUMMARY OF THE INVENTION

The present invention may be summarized as a multicolored display which comprises a high contrast liquid crystal device, a light source rich in red light, and a luminance balanced color mask. The liquid crystal device is the transmissive, twisted-nematic type having high extinction ratio polarizers on the input and output sides and it functions as a light shutter for the display. The liquid crystal material has a dichroic dye admixed therein to prevent buildup of the contrast limiting orthogonal mode electric vector of polarized light. The color mask contains different colored patches with gray surround about them, and each colored patch is luminance balanced with each other and the gray surround in order that each different colored data presented are of substantially equal brightness. During the off-state, there is no light bleed-through and the combined luminance balanced color mask and high optical contrast and density of the TN liquid crystal device enables the multicolored display to present a uniformly dark state or dead front.

DESCRIPTION OF THE PREFERRED EMBODIMENT

Figure 1A:
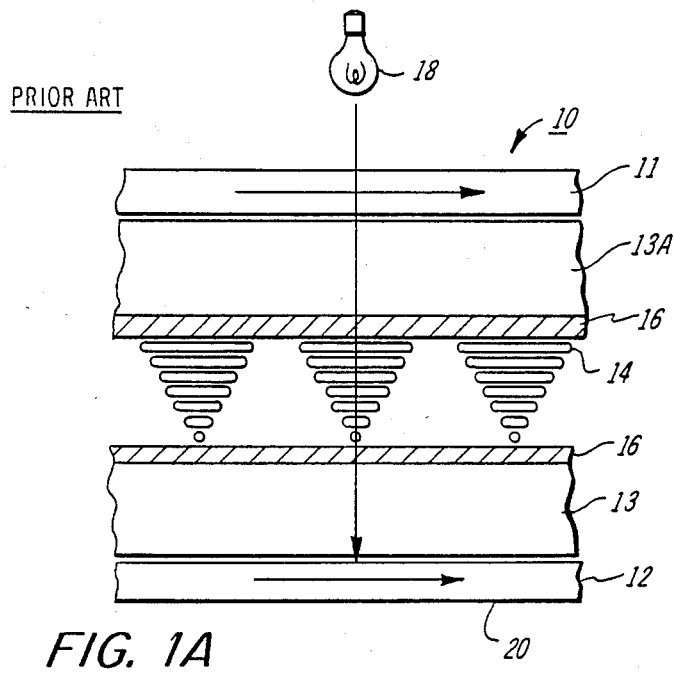
FIG. 1A is a cross-sectional side view of a schematical representation of conventional transmissive-type, twisted nematic liquid crystal device in the off-state condition.
Figure 1B:
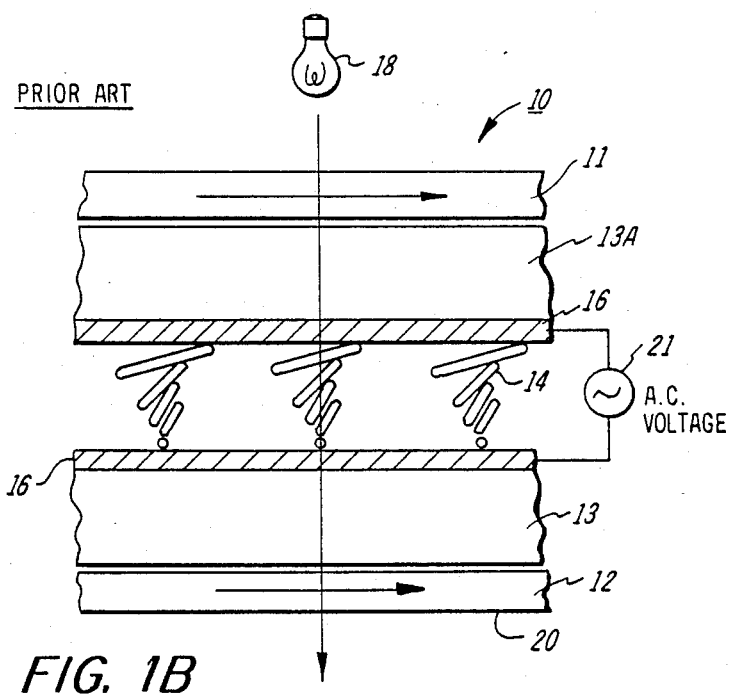
FIG. 1B is a cross-sectional side view of a schematical representation of a conventional transmissive-type, twisted nematic liquid crystal device in the energized or on-state condition.
Figure 2:
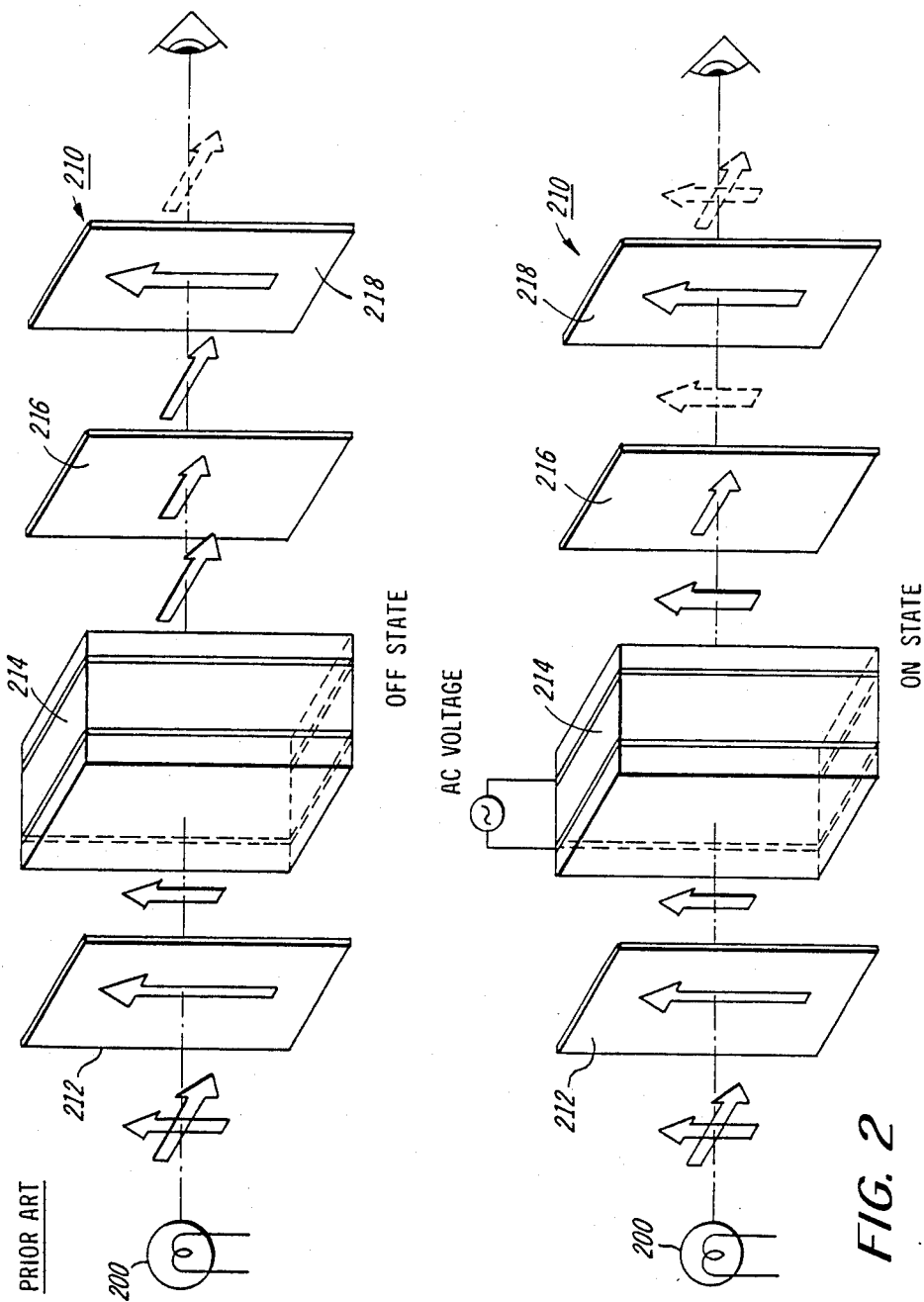
FIG. 2 is a three dimensional, exploded schematical representation of a conventional two-color liquid crystal display showing the display in both the off-state and on-state condition.

FIGS. 1A and 1B show a typical prior art transmissive-type, twisted nematic liquid crystal device 10 in the off-state and the on or energized state, respectively. The device comprises parallel, upper transparent glass substrate 13a and lower transparent glass substrate 13, each having transparent electrodes 16 on the inner confronting surfaces of the glass substrates. A thin layer of nematic liquid cyrstal material in sandwiched between the transparent electrodes. A polarizer 11 and an analyzer 12 are attached to the outer surfaces of the glass substrates. The polarizing axes of the polarizer and analyzer are made parallel and coinciding with the direction of the alignment of the liquid crystal molecules 14 at the upper glass substrate 13a. The liquid crystal molecules gradually twist so that the molecules at the lower substrate have been rotated 90 degrees and are perpendicular to those adjacent the upper glass substrate. The polarized light from source 18 is substantially blocked when viewed from the output side 20 because of the polarizing direction of analyzer 12.

When the electrodes 16 have an alternating current (AC) voltage from source 21 that is above a certain threshold applied across them, the liquid crystal molecules become oriented in a direction substantially parallel to the applied electric field, except for those molecules bound at the surfaces of the glass substrates. In this energized condition, the liquid crystal layer no longer twists the direction of polarization of the light and, therefore, it passes through the analyzer 12.

Figure 3:
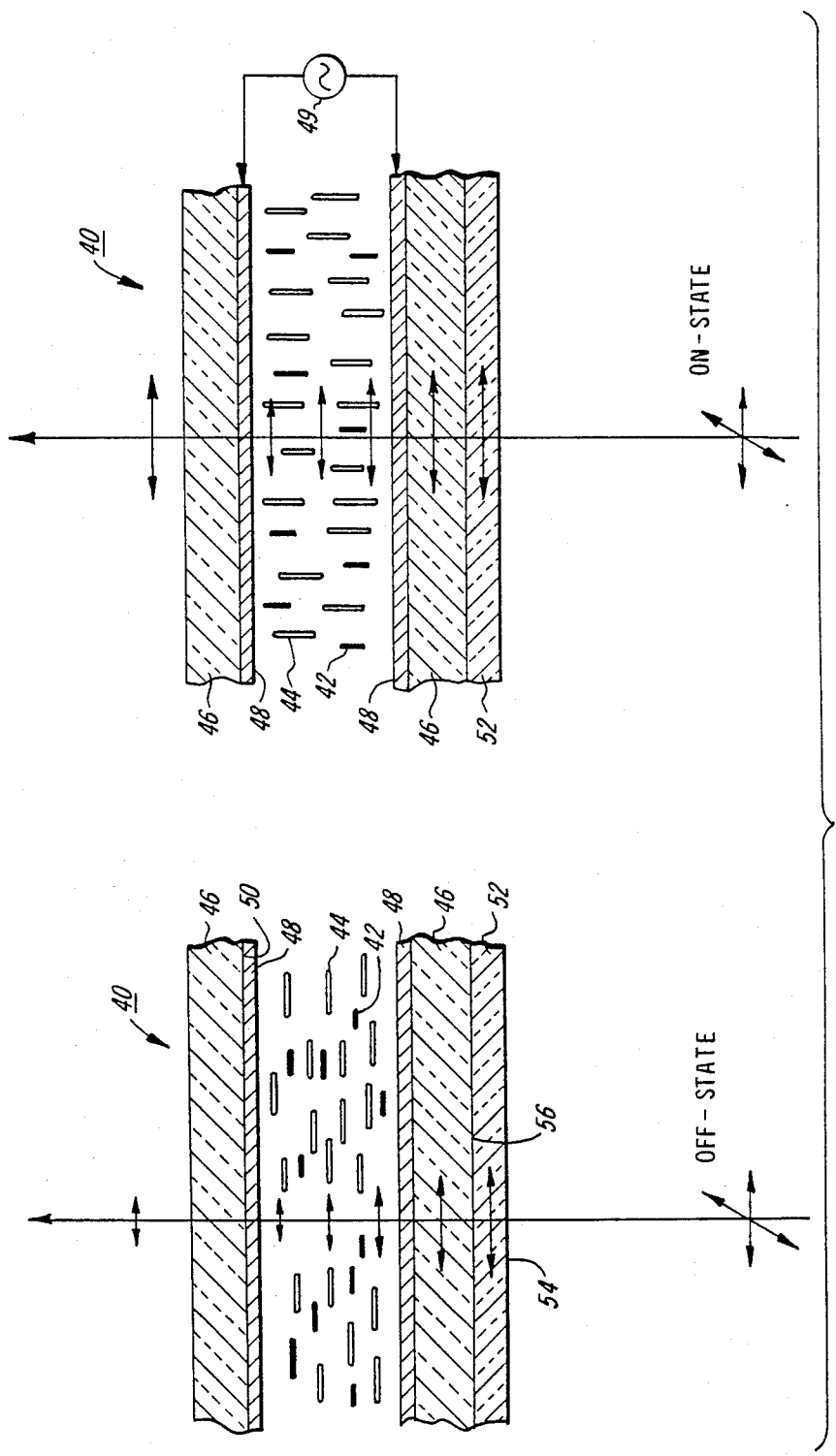
FIG. 3 is a cross-sectional side view of a schematical representation of a typical prior art guest-host effect, transmissive-type liquid crystal display device depicting the off-state and on-state condition.

FIG. 3 is an early, prior art, transmissive-type liquid crystal device 40 having dichroic dye admixed with the nematic liquid crystal material. The dye molecules 42 align themselves with the liquid crystal molecules 44 in a typical guest-host arrangement. The device 40 comprises parallel glass substrates 46 with transparent electrodes 48 placed on the inner, confronting substrate surfaces 50, which substrates sandwich a thin layer of nematic liquid crystal material with a small concentration of dichroic dye. A polarizer 54 was attached to the input surface 56 of the device 40. The polarizing axis of the polarizer is parallel and coincides with the direction of the nematic liquid crystal molecules 44. When an AC voltage is not applied to the transparent electrodes (off-state condition), the dichroic dye molecules absorb much of the polarized light passing therethrough, thus, eliminating the need for a second polarizer/analyzer to block the light when some light bleed-through is acceptable. The device of FIG. 3 is generally referred to as a "Heilmeier-type" device.

When the electrodes 48 have an AC voltage from source 49 that is above a certain threshold applied across them, the host liquid crystal molecules 44 and guest dye molecules 42 become oriented in a direction parallel to the applied electric field. In this energized condition, the liquid crystal layer with dye molecules therein passes the polarized light therethrough.

Figure 4:
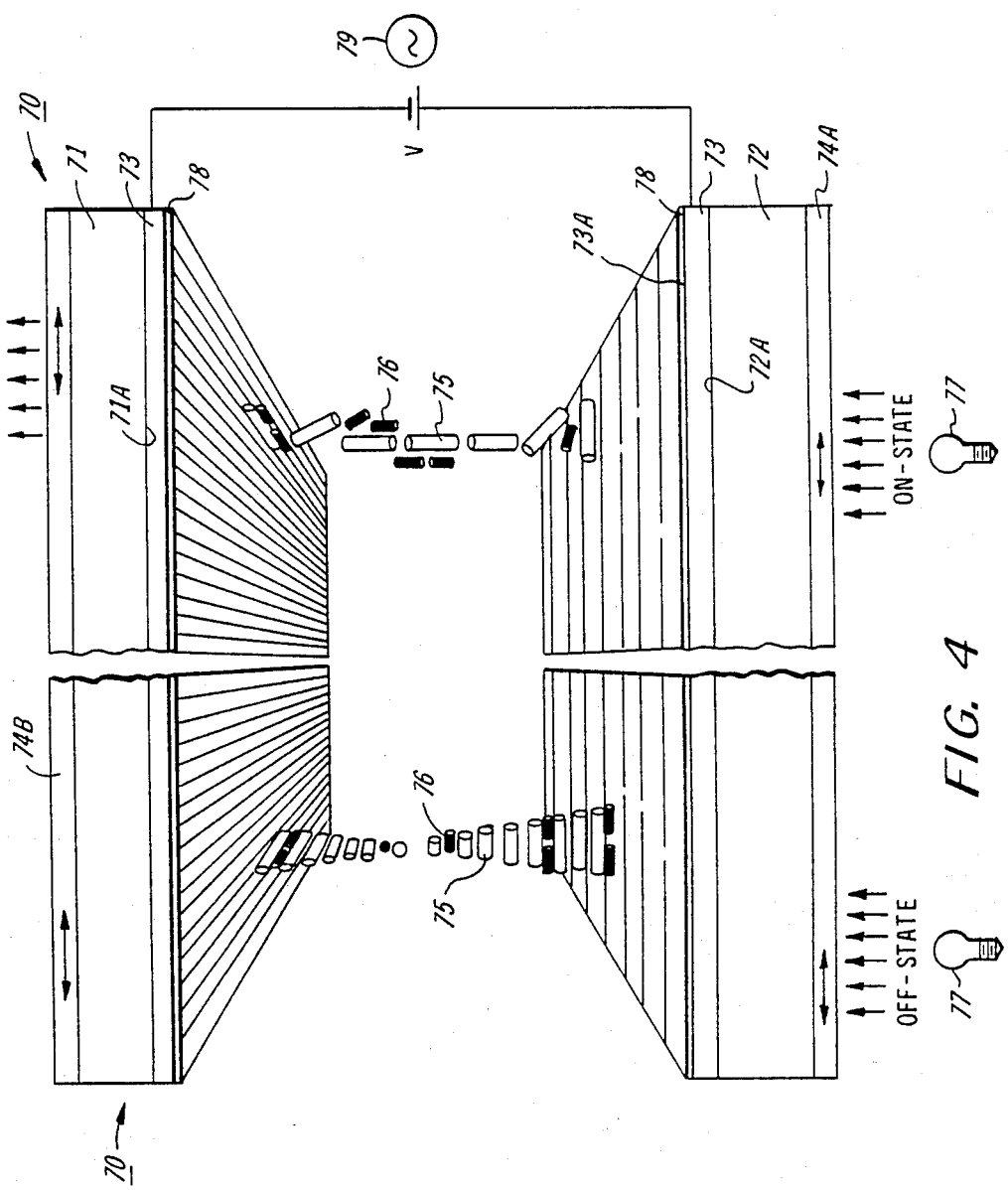
FIG. 4 is a three dimensional, schematical representation of a high-contrast liquid crystal device used in the present invention.

The high contrast, TN liquid crystal device 70 used in the present invention is shown in FIG. 4, wherein a transmission, guest-host type, twisted nematic liquid crystal device 79 is depicted in which a dichroic dye such as anthraquinone or azo dye is admixed with any of the widely used liquid crystal materials. FIG. 4 shows the device 70 in both the off-state and on-state condition. The device 70 comprises parallel, transparent, upper and lower glass substrates 71 and 72, respectively. Transparent electrodes 73 are placed on the inner, confronting surfaces 71a and 72a of the glass substrates. An alignment layer 78 covers the electrodes 73. A thin layer of twisted nematic liquid crystal material, with a relatively small concentration of dichroic dye admixed therein, is sandwiched between the glass substrate surfaces having the electrodes. Polaroid HN32 polarizers 74a, 74b marketed by the Polaroid Corporation are attached to each of the glass substrate surfaces opposite the surfaces having the transparent electrodes. The polarizing axes of both polarizers are made parallel and coincident with the direction of the alignment of the liquid crystal molecules 75 at the surface 73a of the transparent electrode 73 on the lower glass substrate surface 72a. Alternately, the polarizers may be rotated in tandem by 90 degrees and sustantially the same results achieved. The liquid crystal molecules gradually twist in a manner well known in the art so that the molecules at the upper glass substrate surface have been rotated 90 degrees and are perpendicular to those adjacent the lower glass substrate surface. The axes of the dichroic dye molecules 76 are parallel with axes of the liquid crystal molecules in the typical guest-host arrangement. Light source 77 enters the liquid crystal layer through the polarizer 74a on the lower glass substrate 72. In the off-state condition, the polarized light from light source 77 is blocked when viewed from the output side (viz., viewed from the polarizer 74b side) because of the polarizing direction of polarizer 74b after the polarized light has been twisted 90 degrees by the twisted nematic liquid crystal layer. A second component or the orthogonal mode of the polarized light builds up as the light impinges upon layer after layer of liquid crystal molecules. For a 10 micron liquid crystal cell with a liquid crystal birefringence of about 0.15, approximately 2% of the light would ordinarily exist in this mode because its electric vector is orthogonal to the main component. The light in the orthogonal mode would be almost completely passed by the polarizer 74b, but the dichroic dye, specifically added to prevent the build-up of the orthogonal propagating mode, prevents its passing during the off-state condition.

In the on or energized state, an AC voltage from source 79 is applied to the electrodes 73 of the appropriate magnitude (e.g., 1 or 3 volts) to achieve an electric field across the liquid crystal material in a manner well known in the art. The host liquid crystal molecules align themselves with the direction of the electric field and the guest dichroic dye molecules maintain themselves substantially parallel to the host molecules. Thus, the polarized light is transmitted through the device 70.

It is not necessary that a 90 degree twist cell be used to realize the benefits of the described invention. Other twist angles can be used. The twist of the liquid crystal molecules depends both upon the surface treatment and the amount of chiral dopant, which can be a cholesteric liquid crystal.

Applications for a high contrast, TN liquid crystal device as used in the present invention are numerous, but offer an especial appeal for multicolor displays used in automotive instrument panels and office automation equipment, such as copier instrument panels. One of the reasons is that the prevention of light bleed-through enables the liquid crystal display to present a better dead front panel. By dead front panel, it is meant the various messages available for activation by the LCD electrodes cannot be detected in the off state. This dead front or very dark off-state, as well as increased contrast, is realizable with this invention and both are very beneficial for improving the off-state appearance of multicolor liquid crystal display devices.

Figure 5:
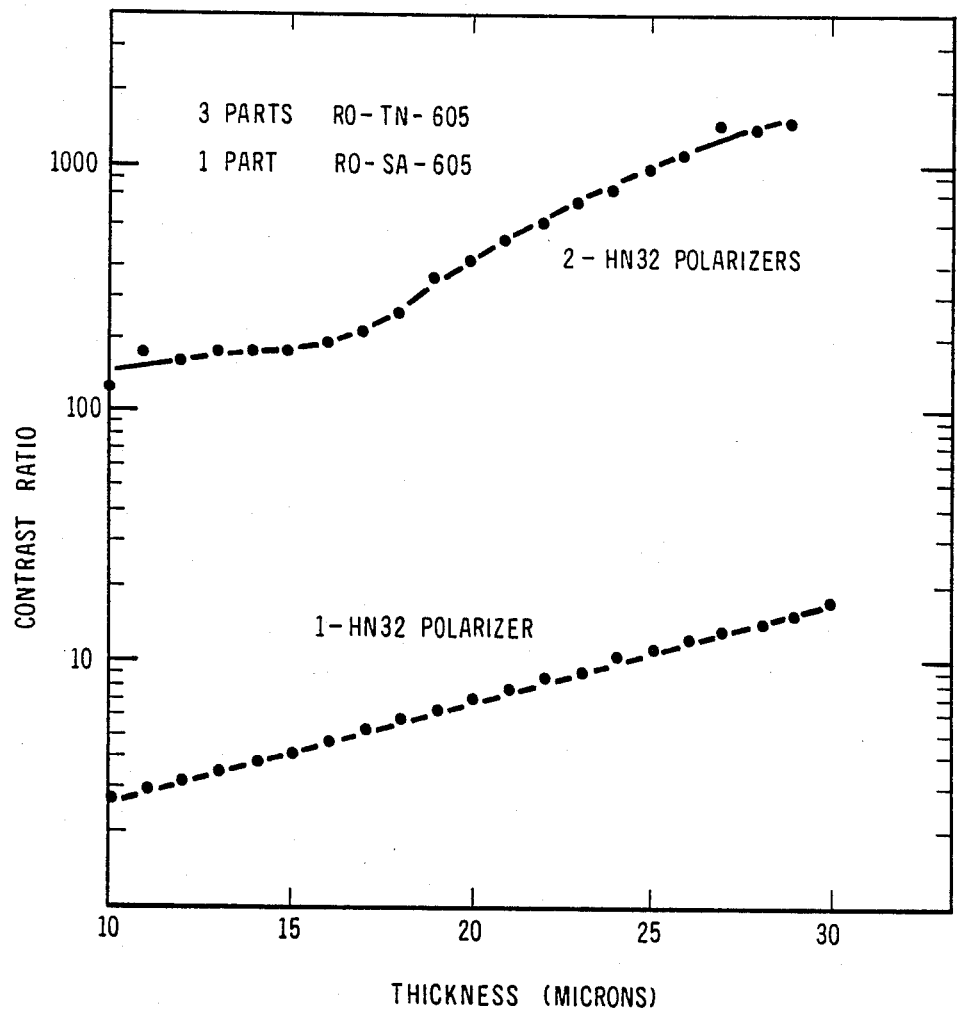
FIG. 5 is a graphical plot of contrast ratio as a function of liquid crystal cell thickness comparing the contrast ratio of a liquid crystal device incorporating a dichroic dye with (a) a single polarizer on the input side and (b) the two polarizer arrangement of FIG. 4.

A plot showing contrast enhancement provided by the present invention is shown in FIG. 5. The lower curve was taken with a single high extinction ratio polarizer on the input side of the device of FIG. 4. Thus, contrast was due to absorption differences with and without the dichroic dye rotated by an electric field. The role the liquid crystal material plays in the one polarizer configuration is to orient the molecules.

The upper curve was obtained using the two polarizer configuration as shown in FIG. 4.

The contrast in the single polarizer device is given approximately by the expression:

$$\text{contrast ratio (CR)} = e^{3Sa_id}$$

Here S is the order parameter of the dye/liquid crystal mixture, $a_i$ is the isotropic absorption coefficient and d is the liquid crystal layer thickness. No closed form expression for the relationship yet exists for the upper curve which is the subject of the present invention.

The liquid crystal/dye mixture used to obtain this experimental data was obtained from Hoffmann-LaRoche Inc. and the mixture has the product designation RO-SA-605. Contrary to the prior art teaching, valuable gains in contrast is achieved without a large amount of dichroic dye. This data was taken with a diluted dye/liquid crystal mixture. The liquid crystal RO-TN-605, also a product from Hoffmann-LaRoche, was used for dilution purposes.

The data was taken using a tungsten source at 2800 degrees Kelvin color temperature. A Pritchard 1980B photometer was used to measure the photopic contrast ratio. Using Polaroid HN32 polarizers, an off-state density greater than 3 was measured using the device shown in FIG. 4.

It is well known that a multicolor liquid crystal display can be created by placing a mask with colored films in a patch-wise fashion therein closely adjacent a convention transmissive, TN liquid crystal display and by directing light through the colored films and into the input side of the liquid crystal device. In using such an arrangement different colored messages and/or symbols can be created on a dark background. The background of a typical multicolor TN liquid crystal device is not opaque in the off-state condition because some light leaks making the color patches and/or electrode information configuration within the liquid crystal apparent to the viewer.

In the present invention, the high contrast liquid crystal device described earlier is used as a light shutter in conjunction with a multicolor mask having a plurality of color patches in a gray surround 317. The high contrast of the liquid crystal device used prevents the detection of color by an observer because the normal bleed-through prevalent in conventional devices that is attributable to the orthogonal mode of the electric vector of polarized light has been eliminated as discussed above. Furthermore, the brightness or more accurately the luminance of the light coming through the patches has been matched to that coming through the surround 317. With this combination, visualization of the patches as well as any messages or data is wholly eliminated and a completely dark output or "dead front" is presented to an observer, making such a display more appealing for use in such equipment as automotive instrument panels and office copier panels.

The threshold for detection of a contrast or density gradient has been determined to be approximately 0.5% optical contrast. Refer to studies on the visibility threshold by:

P. W. Cobb and F. K. Moss, "The Four Variable of Visual Threshold", J. Franklin Inst., 205, 831 (1928) and J. P. Connor and R. E. Ganoung, "An Experimental Detemination of Visual Thresholds at Low Values of Illumination," J. Opt. Soc. Am. 25, 287 (1935)

Figure 9:
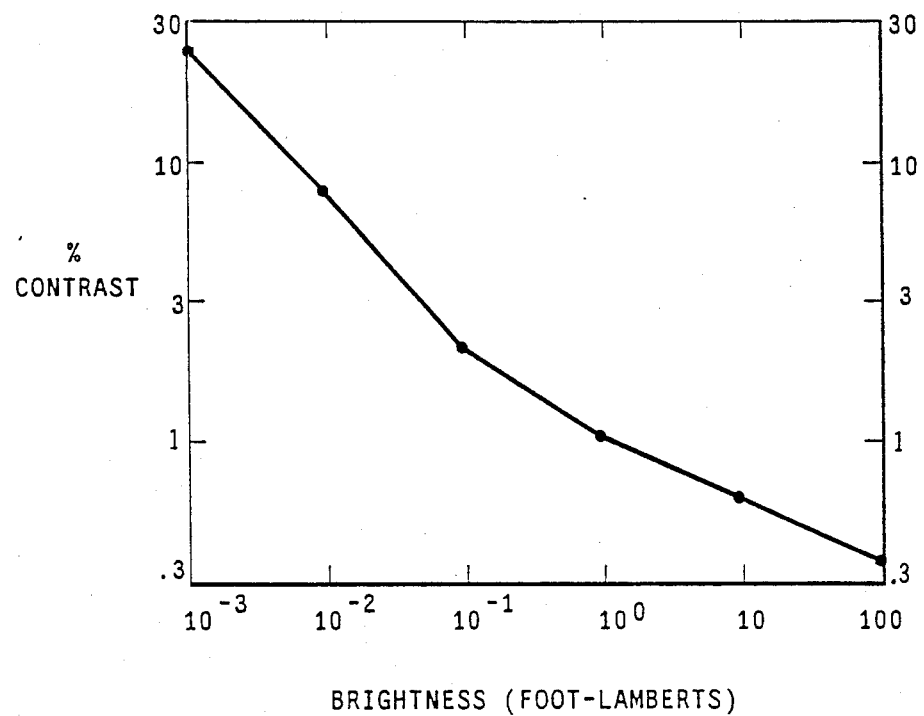
FIG. 9 is a graphical plot of Percent Optical Contrast versus Brightness in foot-Lamberts.

Cobb and Moss studied high lumination level situations while Connor and Ganoung studied the low regime. The visibility threshold is somewhat dependent on brightness and FIG. 9 shows the observed dependence. It should be noted that the results depend on other variables also such an object size. The data presented to develop the FIG. 9 curve was for objects of angular size of 10 minutes of arc. The portion of the curve of interest are for typical lumination levels which is in the 1 to 100 foot-Lamberts regime.

The high contrast/high density liquid crystal display used in the present invention in conjunction with a highly balanced color mask underlay drops the contrast to about the threshold value. The intensity of the light is also reduced to a value outside the dynamic range of the eye which is about 3 orders of magnitude. The balanced color underlay is sufficiently reduced in luminance by the high contrast/high density liquid crystal device to render it invisible even when the illuminator behind it is quite bright. The illuminator used in this invention has a surface luminance of approximately 1000 foot-Lamberts.

Figure 8:
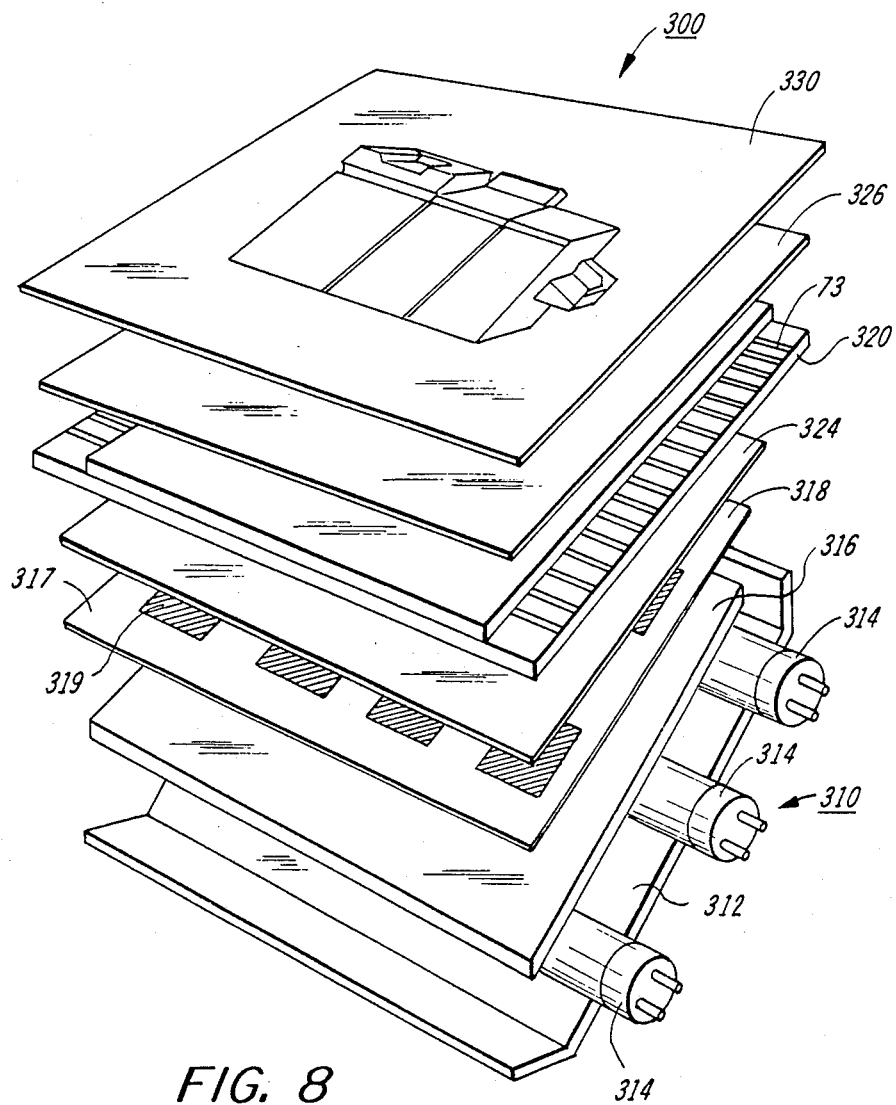
FIG. 8, is a three dimensional, exploded schematical representation of the multicolor display of the present invention, incorporating the liquid crystal display device of FIG. 4.

FIG. 8 shows an exploded view of the multicolor display 300 of the present invention. The illuminator 310 comprises a reflector 312, fluorescent light source 314 (preferably, Cool White Deluxe F40T12 for reasons discussed below), and a light diffuser 316. The color balanced mask 318 is positioned between the illuminator 310 and input side of the high contrast TN liquid crystal device which is more fully described with reference to FIG. 4. The transparent electodes 73 of FIGS. 4 and 8 that are on the upper and lower glass substrates 71 and 72, respectively, comprise a plurality of closely spaced, electrodes. The electrodes on one of the substrates are perpendicular to the electrodes on the other so as to form an addressable matrix in a manner well known in the art. Alternately, the electrodes can be of arbitrary shape. Activation of selected ones of the electrodes on the substrates enable the passage of light through the liquid crystal material in selected regions. Therefore, by appropriately applying a potential difference to selected electrodes, messages or graphical information may be displayed. Furthermore, large area blocks of the liquid crystal cell could be activated and the information displayed from color underlays. The mask 318 contains multicolor patches 319 in a gray surround 317. High extinction ratio polarizers 324 and 326 are attached to the input and output sides of the liquid crystal display 320 as discussed before with reference to FIG. 4. Overlays 330 such as one shown with a machine configuration may be placed on the output side of the liquid crystal device 320 and/or included in an underlay (not shown).

This invention uses the high contrast and high density liquid crystal device and a balanced color mask to reduce the contrast below the gray scale threshold for discrimination. It also allows operation at a sufficiently low luminance level that an observer's ability to detect differences based upon color discrimination is lost. Hence, a completely "dead front" appearance is realized.

Balancing of the luminance of the color patches 319 in the mask 318 does not have to be done exactly to provide a non-discernable density difference which, with the high contrast liquid crystal device, prevents light bleed-through and, thus, a completely "dead front" panel to an observer. Even approximately matching of the luminance of the color patches gives a greatly improved performance.

One set of color patches tested had the following percent luminance transmission:

| | |
|---|---|
| yellow | 84% |
| blue | 34% |
| red | 21% |
| green | 39% |

When a gray surround 317 having a luminance transmission of 50% was used as the mask 318 to hold the color patches 319 above, a substantial reduction in the visability of the patches was realized. Accordingly, a part of the present invention is the matching of the color patches 319 and the surround 317 more precisely to achieve perception by an observer of a panel having uniform density with no light passing through.

It is important to realize that the necessary requirement is to balance the luminances of the color patches 319 to the surround 317, not the luminance transmission. The reasons for this distinction is that the invention can be used with a variety of light sources which typically differ in their spectral output. For example, incandescent light sources are very rich in red light, white fluorescent light sources are typically deficient in red light. Fluorescent sources have advantages such as longer life and smaller amounts of heat generated, however, which makes them attractive for displays. Because the fluorescent sources have a number of intensity spikes at particular wavelengths, these spikes must be taken into consideration in the display design.

Figure 11:
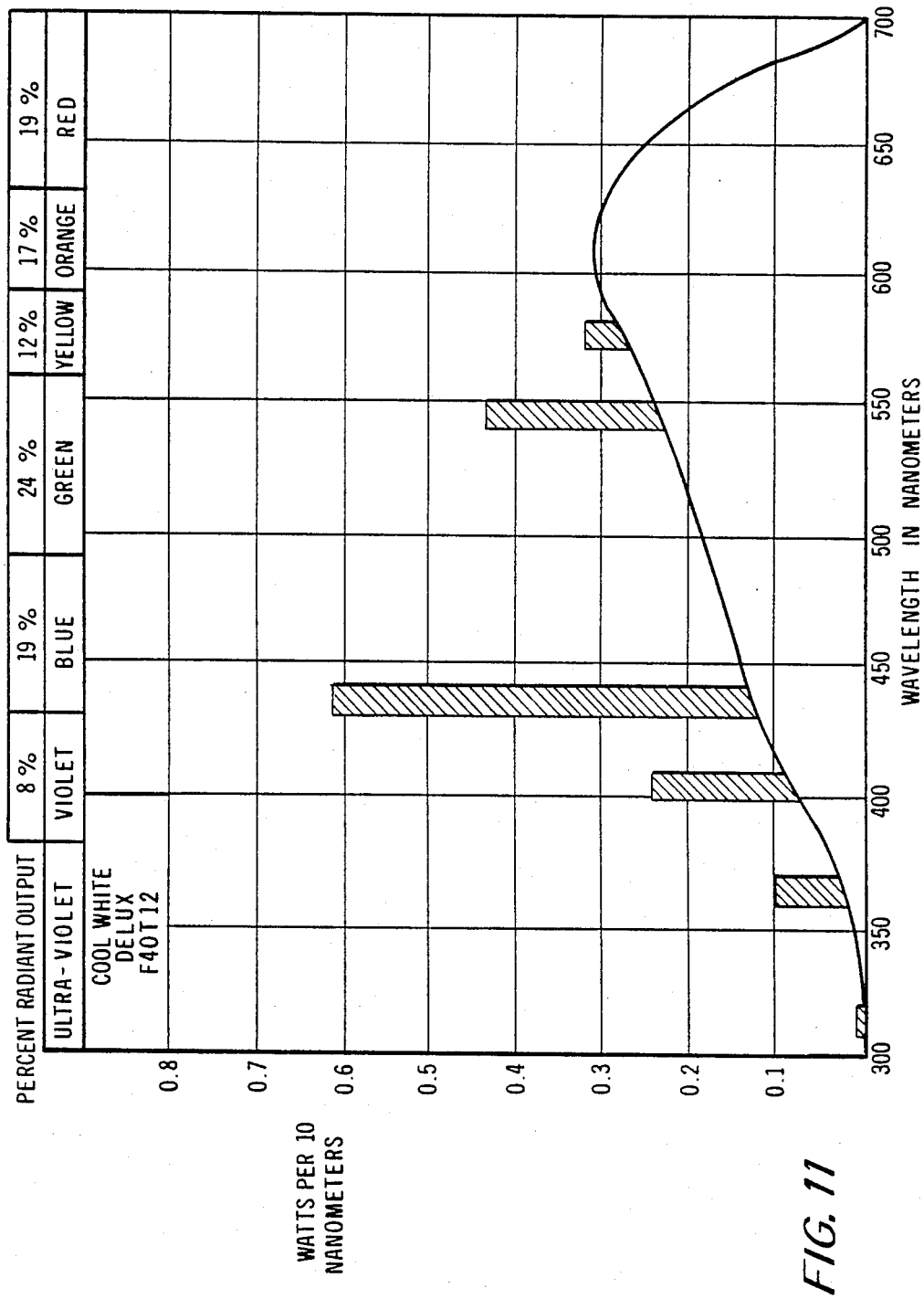
FIG. 11 is a graphical plot of wavelengths of light in nanometers versus watts per 10 nanometers for a fluorescent light (Cool White Deluxe F40T12).

FIG. 11 shows the spectral profile of a fluorescent phosphor light source 314 (Cool White Deluxe F40T12) used in the present invention, because the white phosphor of this light has a higher output in the red portion of the spectrum than other fluorescent sources and a more uniform overall spectral content.

The balanced color mask used in this invention can be fabricated using a variety of techniques; for example, color photographic film may be used. In principle, all that is necessary is to adjust the film exposure to give the required light transmission properties. Other possible approaches are silk screen printing of colored inks as well as conventional printing technologies practiced in the graphic arts.

The preferred technique to provide a luminance balanced color mask is by a photographic procedure with light sensitive material whereby the various color patches are created on a material marketed by Agfa-Gevaert called Copyproof (trademark) by contact exposure. The color patches created on Copyproof were found to produce brighter blue and red patches; i.e. more colored light is transmitted through them.

Figure 10:
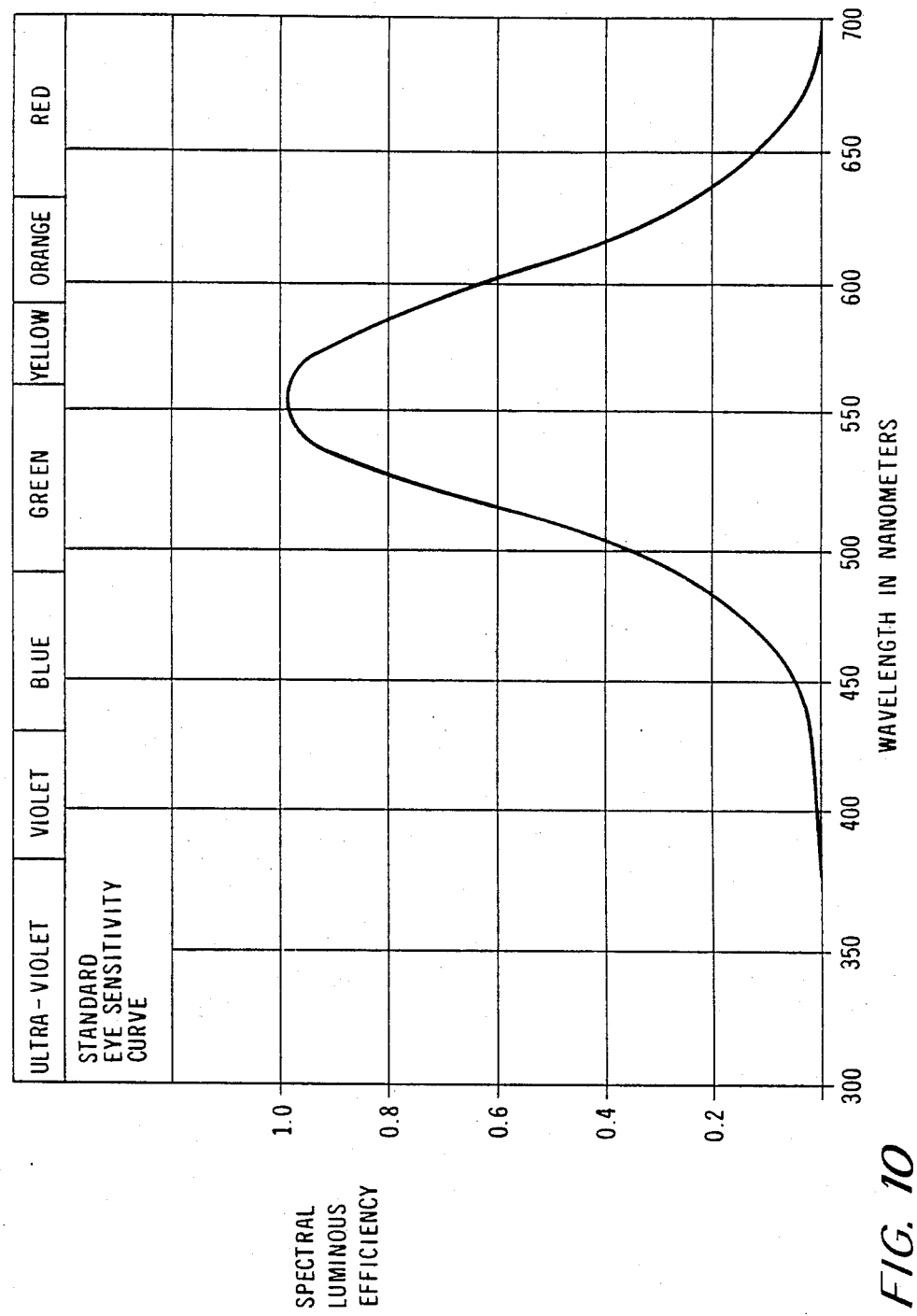
FIG. 10 is the Standard Eye Sensitivity Curve plotted as spectral luminous efficiency verus wavelengths in nanometers.

Before describing the results obtained using Copyproof, it is useful to define a few terms. The human visual system has its maximum sensitivity in the green portion of the spectrum (550 nanometers). The eye's sensitivity drops off on either side of this point. Simply stated, our eye is less sensitive to red and blue than it is to green light. FIG. 10 shows the eye sensitivity as a function of wavelength. Photometric units, such as lumens and foot Lamberts have this weighting function built in.

A useful concept for selecting color patches is their luminous transmittance which is defined as the fraction of white light transmitted by a sample weighted by the eye's spectral sensitivity function.

This term applies to any white light source. Since different white light sources of light vary somewhat in their output spectral profile, the luminous transmittance depends on the light source as well. As discussed above, fluorescent lighting for this invention was selected, the preferred one being Cool White Deluxe F40T12 (FIG. 11).

The luminance transmittance of the Agfa-Gevaert Copyproof material is given below in Table 2(a) for varous colors. Note that they vary from 17 to 75%. Using a haftoning technique described later, the lumination transmission is balanced within a few percent as shown in Table 2(b).

TABLE 2(a)

SOURCE WEIGHTED* LUMINOUS TRANSMISSION OF AGFA-GEVAERT MATERIAL

| Red | 17% |
|---|---|
| Blue | 21% |
| Green | 43% |
| Yellow | 75% |

*Cool White Deluxe Fluorescent Lamp

TABLE 2(b)

SOURCE WEIGHTED* LUMINOUS TRANSMISSION OF AGFA-GEVAERT MATERIAL AFTER BALANCING

| Red | 29% |
|---|---|
| Blue | 29% |
| Green | 30% |
| Yellow | 33% |
| White | 31% |

*Cool White Deluxe Fluorescent Lamp

As mentioned above, halftoning of all of the color patches are necessary to obtain the perceived uniform density of the multicolor display panel of this invention by an observer; that is, a "dead front" panel. Halftones are accomplished by adding small black dots in the colors more sensitive to the eye and small white holes to emit more light in those colors less sensitive to the eye. The number of dots per unit length is fixed in this invention by the use of 150 dot/inch screens to photographically create the halftoning.

Figure 12:
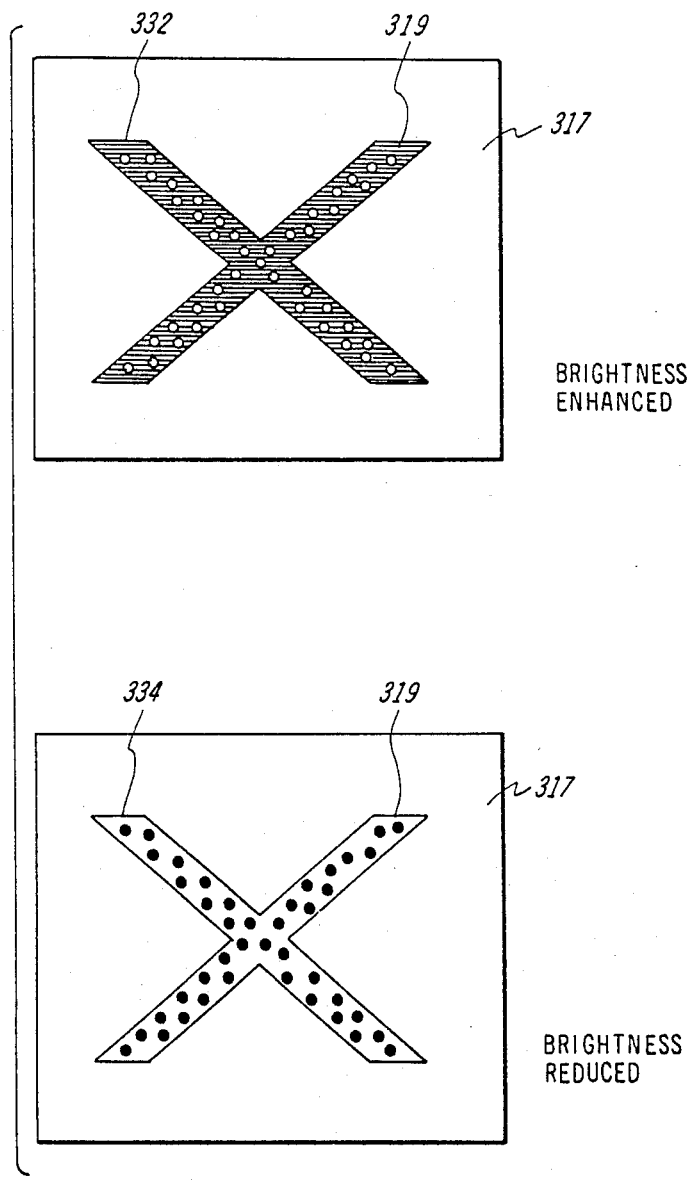
FIG. 12 is a schematical representation of color patch brightness enhancement and brightness reduction.

Opaque black dots are used to dim the bright green, yellow and white patches. Typically, the black dots occupy 30 to 50% of the area. The brightness of the red and blue patches are increased by opening small transparent holes to increase the brightness of the relatively dim blue and red regions. Since the holes are clear to all wavelengths, color saturation is decreased by this approach. Therefore, these holes cannot be too large and for best results should be in the range of 10 to 20% open area; i.e.; the transparent holes comprises no more than 10% to 20% of the total colored patch area. FIG. 12 shows the halftoning concept used in the present invention.

FIG. 12 shows surround 317 with a color patch 319 therein. When the color of the patch is red or blue, the brightness must be enhanced and small transparent holes 332 are created in the patch. When the color of the patch is yellow, green or white, the brightness must be reduced and small opaque black dots 334 are placed therein.

Brightness matching by halftoning techniques is an attractive approach because it is highly reproducible and because it is digital in nature rather than analog, thus giving all the benefits of a two-state system. By two-state system it is meant the holes are fully transparent and the dots are essentially opaque without varying the degrees of light transmittance therethrough.

Figure 6:
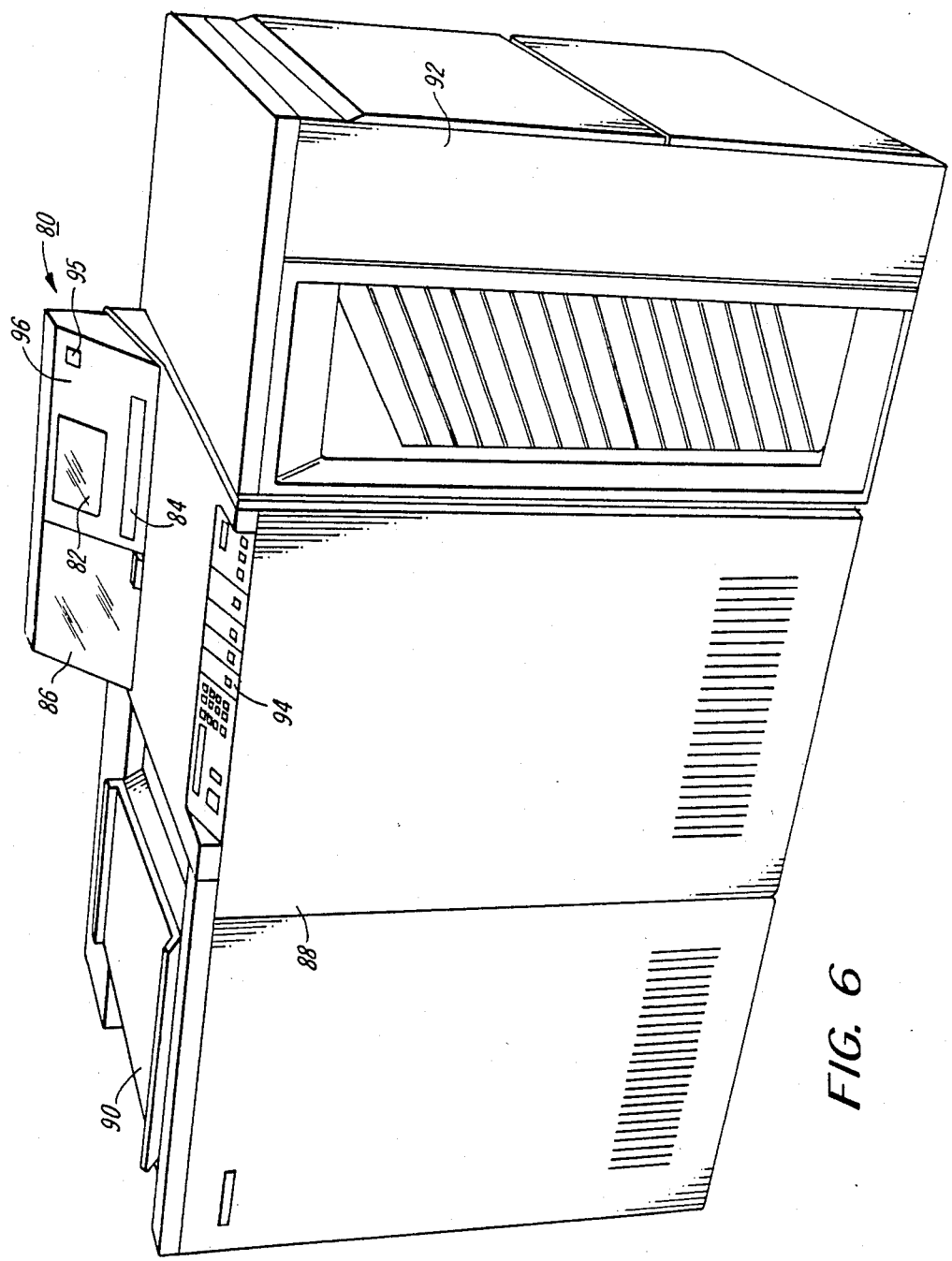
FIG. 6 is a schematic of a xerographic copier with which the present invention has utility.

The present invention relates to multicolor liquid crystal display which presents a uniformly dark state or dead front during the off-state and has particular utility, as mentioned above, for use in automotive instrument panels and office equipment such as xerographic printers and copiers. FIG. 6 shows an example of the use of a multicolor liquid crystal display (LCD) 82 in a copier 80. The detail description of the multicolor LCD 82 is more fully described with reference to FIGS. 4 and 8. The multicolor display 82 cooperates with alphanumeric display 84 to efficiently prompt the user regarding copier status, inform him of certain faults as they occur, and refer the user to flip charts 86 in the event that instructions to be given require more detail than can be conveniently displayed on the multicolor LCD 82 and alphanumeric display 84. Refer to U.S. Ser. No. 420,963 to John W. Daughton et al filed Sept. 21, 1982 and assigned to the same assignee as that of the present invention for operational and electronic interface details between the copier microprocessor and the multicolor LCD. Accordingly, the subject matter of the Daughton et al case is hereby incorporated by reference.

The copier 80 includes a housing 88 which provides an attractive appearance and covers typical copier components and subassemblies. The particular copier 80 schematically illustrated includes a platen and platen cover 90. The platen cover 90 is hinged to allow the user to raise and lower the cover 90 and insert original documents onto the platen (not shown) for copying. The copier 80 also includes a sorter 92 which provides collated copy sets of multiple document originals. A control panel 94 allows a user to select copy size, copy contrast, number of copies to be made, and the manner in which the copies are to be made (e.g., duplex or simplex copies). The panel 96 having the multicolor liquid crystal display 82 also includes a button 95 for starting the copying operation.

As the user approaches the copier 80 both the LCD 82 and alphanumeric display 84 are blank and can display nothing until the user activates the "Power On" switch 95 to energize the power supply inside the copier 80. Once the power has been turned on, a "Standby" message will appear on the alphanumeric display 84 indicating the copier is not yet ready for use. Once the copier 80 is ready for making xerographic copies, the alphanumeric display 84 shows a "Ready To Make Copier" message telling the user that the copier 80 is ready for operation.

Figure 7:
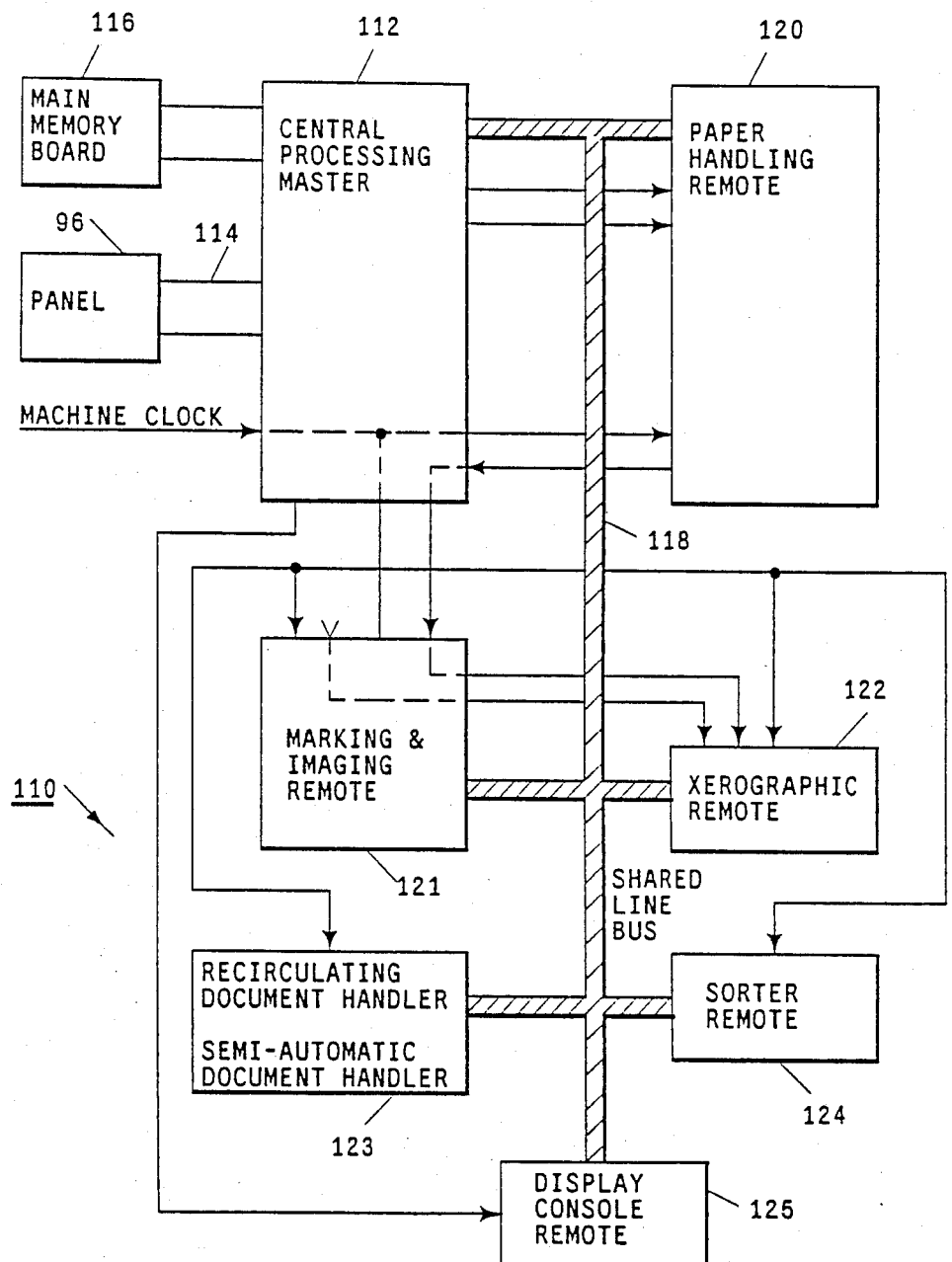
FIG. 7 is a schematic of the electronics used to both control and monitor xerographic functions inside the copier of FIG. 6.

The functioning of the components comprising the copier 80 is controlled and monitored by an electronics subsystem 110 (FIG. 7) comprising a number of programmable controllers which communicate with a master central processor 112. An interface 114 between the panel 96 and main processor 112 apprises the processor 112 of inputs entered by the user regarding number of copies, etc. The main processor 112 responds to user inputs by executing its operating system stored in a main memory unit 116.

The algorithm in main memory 116 causes the master central processor 112 to communicate along a communications bus 118 to a number of remote electronics units 120-125 used to monitor and control the copier. The specific units 120-125 vary with copier architecture so the FIG. 7 schematic is representative of one of many possible electric subsystems schematics. Each unit 120-125 has its own microprocessor with accompanying memory (both RAM and ROM) and support circuitry.

The multicolor LCD 82 and alphanumeric displays 84 are electrically coupled to a display console remote unit 125. The display console remote unit 125 receives status information, fault information, or program control information from the main processor 112 and then displays an appropriate message on the alphanumeric display 84, and if appropriate, energizes one of a plurality of liquid crystal segments on the multicolor LCD display 82 or addresses the electrode matrix within the liquid crystal cell to create information.

The multicolor liquid crystal display 82 is mounted directly above the alphanumeric display 84 and located to the side of the flip chart 86. The multicolor alphanumeric display 84 comprises a vacuum fluorescent tube capable of generating messages helpful to the copier user.

The multicolor liquid crystal display 82 positioned directly above the alphanumeric display includes various liquid crystal segments as well as an addressable electrode matrix to aid the copier user in both interacting with the copier and correcting faults should they occur during operation.

The particulars regarding the liquid crystal cell operation within the liquid crystal display device 70 has been discussed with reference to FIG. 4. FIG. 8 shows an exploded schmatical representation of one configuration of a multicolor LCD 300 that may be used in a copier environment such as that of FIG. 6. In FIG. 8, fluorescent lights 314 direct light with the aid of reflector 312 and diffuser 316 through a color mask 318 behind the liquid crystal device 320. When the liquid crytal electrode elements are in an unenergized state, no light from the illuminator 310 reaches the user. When the electrode elements in the multicolor liquid crystal display 82 (or 320), however, are energized, they allow light to pass through the energized segment of the liquid crystal to the user. Thus, when an appropriate ones of the liquid crystal electrodes are energized by signals from the display console remote unit 125, it is rendered visible due to light passage through that segment.

Recapitulating, the present invention relates to a multicolor display which comprises a high contrast liquid crystal device, light source and a luminance balanced color mask which during the off-state presents a uniformly dark state or dead front because there is no light bleeding through the liquid cystal device and the luminance balanced color mask presents a uniform optical density below the threshold for visual detection by an observer.

The liquid crystal device is the transmissive, twisted nematic type having high extinction ratio polarizers on the input and output sides and functions as a light shutter for the display. The liquid crystal material has a dichroic dye admixed therein to prevent buildup of the contrast limiting orthogonal mode electric vector of polarized light. The color mask contains different colored patches with gray surround about them, and each colored patch is luminance balanced. Therefore, each different colored data presented are of substantially equal brightness.

The specific use of the present invention in a copier environment discussed above was only for purposes of illustrating a particular use and was not intended as an only use. To the contrary, the present invention is important for many different environments.

Many modifications and variations are apparent from the foregoing description of the invention and all such modifications and variations are intended to be within the scope of the present invention.

I claim:

1. A multicolor liquid crystal display device having an output panel comprising:

a liquid crystal cell including two transparent, insulating substrates arranged in parallel and each with a confronting surface bearing at least one transparent electrode, a layer of nematic liquid crystal material having liquid crystal molecules parallel to the substrates, said layer being contained between the insulating substrates with said liquid crystal molecules being gradually twisted between the substrates, the cell being capable of transmitting light therethrough in the vicinity of the electrodes upon the application of an electric field across the layer when a potential difference of appropriate magnitude is applied between the electrodes;

a light source having a relatively uniform spectral content for directing light towards one of the insulating surfaces;

means for applying a potential difference between said electrodes and producing an electric field across said cell, when an electric field exists across the cell, said liquid crystal molecules align themselves substantially parallel with the direction of the electric field;

a high extinction ratio polarizer being located on each insulating substrate surface opposite the ones with the electrodes for polarizing the light received from the light source, the polarizers having polarizing axes which are parallel or orthogonal to the direction of the liquid crystal molecules adjacent the insulating surface nearer to the light source, said polarizers having an extinction ratio which enables the attainment of a contrast ratio of greater than 100 from the liquid crystal cell during passage of the main vector component of polarized light;

a relatively small amount of dichroic dye being admixed with the liquid crystal material to form a guest-host mixture therewith, molecules of the dichroic dye being the guest molecules and being of sufficient in quantity for absorbing and thus preventing the buildup and subsequent passage of an orthogonal vector component of polarized light created by imperfect rotation of the polarized light by the orientation of the twisted nematic liquid crystal molecules when no electric field is present; and a luminance balanced color mask located between the light source and the liquid crystal cell, the mask containing a plurality of color patches with the rest of the mask being a gray surround, each color patch being luminance balanced with each other and the gray surround in order that each different patch and the gray surround have substantially equal luminance transmission, so that the output panel appears as a uniformly dark, dead-front output panel to an observer, when a potential difference is not applied to the cell electrodes.

2. The multicolor liquid crystal display device of claim 1, wherein the polarizers are Polaroid HN-32.

3. The multicolor liquid crystal display device of claim 1, wherein said cell has a plurality of electrodes on each substrate surface and each electrode is capable of being individually addressed by said means for applying a potential difference to create information readable by an observer.

4. The multicolor liquid crystal display device of claim 3, wherein the plurality of electrodes on each substrate surface comprise a series of closely spaced electrodes, the electrodes on each of the substrate surfaces being mutually perpendicular so that the application of a potential across selected electrodes permits matrix addressing.

5. The multicolor liquid crystal display device of claim 1, wherein the guest host mixture is Hoffman-LaRoche RO-SA-605 and the thickness of the layer of said mixture is 10 microns.

6. The multicolor liquid crystal display device of claim 1, wherein the light source is a fluorescent light having a relatively uniform spectrum with a high red light content.

7. The multicolor liquid crystal display device of claim 6, wherein said light source is a Cool White Deluxe F40T12 fluorescent light.

8. The multicolor liquid crystal display device of claim 6, wherein the fluorescent light is a phosphor light having at least a 19 percent red light spectral content.

9. The multicolor liquid crystal display device of claim 1, wherein said color patches in said mask are luminance balanced by dimming the colors more sensitive to the eye of an observer with a screen of relatively small opaque dots and by brightening the colors less sensitive to the eye of an observer by a series of relatively small transparent holes.

10. The multicolor liquid crystal display device of claim 9, wherein said mask is Agfa-Gevaert's Copyproof product or equivalent and the opaque dots and transparent holes are photographically produced in said color patches by the use of 150 dot/inch screens, the transparent holes comprising no more than 10% to 20% of the total color patch area and the opaque dots comprising no more than 30% to 50% of the total color patch area.

11. The multicolor liquid crystal display device of claim 1, wherein the guest host mixture is a diluted mixture of one part Hoffmann-LaRoche RO-SA-605 and three aprts Hoffmann-LaRoche RO-TN-605.

12. A method of providing a multicolor liquid crystal display device selectively capable of being in the on-state or off-state condition and having a uniformly dark, dead-front output panel when in the off-state condition, said method comprising the steps of:

providing a liquid crystal cell having a pair of parallel, transparent glass substrates with transparent electrodes on their confronting surfaces, and a twisted nematic liquid crystal material contained between the substrates;

attaching high extinction ratio polarizers on each of the substrate surfaces opposite the confronting ones, the polarizing axes of both polarizers being either parallel or orthogonal with the direction of molecules of the liquid crystal material adjacent the substrate surface selected as the input substrate which is to receive light from a light source, said polarizers having an extinction ratio which enables the attainment of a contrast ratio of greater than 100 from the liquid crystal cell during passage of the main vector component of polarized light;

admixing a relatively small amount of dichroic dye with the liquid crystal material to form a guest-host mixture of liquid crystal and dye molecules, the amount of dichroic dye being sufficient to absorb an orthogonal vector component of polarized light created by the imperfect rotation of the polarized light by the orientation of the twisted nematic liquid crystal molecules when no electric field is present;

directing light from a source having a relatively uniform spectral content toward said polarizer on the input substrate so that the light received by the input substrate is polarized;

applying an alternating current voltage across the electrodes to change the orientation of the molecules of mixture and enable the passage of light when the passage of light is desired; and inserting a luminance balanced multicolor mask between said light source and said polarizer on the input substrate of the liquid crystal cell, so that the liquid crystal cell with the dichroic dye and two high extinction ratio polarizers in combination with the luminance balanced color mask cause said output panel to appear uniformly dark to an observer when said multicolor liquid crystal display device is in the off-state condition.

13. The multicolor liquid crystal display device of claim 1, wherein the guest host mixture is less than 10 weight percent dichroic dye.

14. The method of claim 12, wherein the liquid crystal/dye mixture is Hoffmann-LaRoche RO-SA-605.

15. The method of claim 12, wherein the liquid crystal/dye mixture is one part Hoffmann-LaRoche RO-SA-605 and three parts Hoffmann-LaRoche RO-TN-605.

16. The method of claim 12, wherein said light source being directed to the polarizer on the input substrate is a fluorescent phosphor light with a red light content of at least 19 percent.

17. The method of claim 16, wherein the fluorescent light is a Cool White Deluxe F40611.

18. The method of claim 12, wherein said color mask contains multiple colored patches in a gray surround, the method further comprising balancing of luminance between the colors and gray surround by dimming the colors more sensitive to the eye of an observer with a screen of relatively small opaque dots and by brightening the colors less sensitive to the eye of an observer by a series of relatively small white or transparent holes.

19. The method of claim 19, wherein the opaque dots and transparent holes are photographically produced in said color patches by the use of uniform dot screens having 150 dots/inch; and wherein the transparent holes comprise no more than 10 to 20 percent of the total color patch area and the opaque dots comprise no more than 30 to 50 percent of the total color patch area.

* * * * *

UNITED STATES PATENT AND TRADEMARK OFFICE
CERTIFICATE OF CORRECTION

PATENT NO. : 4,506,956
DATED : March 26, 1985
INVENTOR(S) : Gary A. Dir

It is certified that error appears in the above-identified patent and that said Letters Patent are hereby corrected as shown below:

Claim 11, Column 17, line 49, delete "aprts" and insert --parts--

Claim 17, Column 18, line 47, delete "F40611" and insert --F40T12--

Signed and Sealed this

Fourth Day of February 1986

[SEAL]

Attest:

DONALD J. QUIGG

Attesting Officer

Commissioner of Patents and Trademarks